(12) United States Patent
Xiao et al.

(10) Patent No.: US 8,831,116 B2
(45) Date of Patent: Sep. 9, 2014

(54) METHOD AND APPARATUS FOR PROVIDING CHANNEL QUALITY AND PRECODING METRIC FEEDBACK IN AN ORTHOGONAL FREQUENCY DIVISION MULTIPLEXING COMMUNICATION SYSTEM

(75) Inventors: Weimin Xiao, Hoffman Estates, IL (US); Amitava Ghosh, Buffalo Grove, IL (US); Rapeepat Ratasuk, Hoffman Estates, IL (US)

(73) Assignee: Motorola Mobility LLC, Libertyville, IL (US)

(*) Notice: Subject to any disclaimer, the term of this patent is extended or adjusted under 35 U.S.C. 154(b) by 386 days.

(21) Appl. No.: 12/045,094

(22) Filed: Mar. 10, 2008

(65) Prior Publication Data

US 2008/0232492 A1 Sep. 25, 2008

Related U.S. Application Data

(60) Provisional application No. 60/895,851, filed on Mar. 20, 2007.

(51) Int. Cl.
| | |
|---|---|
| *H04K 1/10* | (2006.01) |
| *H04L 1/00* | (2006.01) |
| *H04B 7/06* | (2006.01) |
| *H04B 7/04* | (2006.01) |
| *H04L 27/26* | (2006.01) |
| *H04L 25/03* | (2006.01) |
| *H04L 5/02* | (2006.01) |

(52) U.S. Cl.
CPC ........... *H04L 1/0026* (2013.01); *H04L 27/2601* (2013.01); *H04B 7/066* (2013.01); *H04B 7/0632* (2013.01); *H04L 2025/03414* (2013.01); *H04L 5/023* (2013.01); *H04L 25/03343* (2013.01); *H04B 7/0417* (2013.01); *H04L 2025/03426* (2013.01)
USPC .......................................... 375/260; 375/259

(58) Field of Classification Search
USPC ................................... 375/260, 259
See application file for complete search history.

(56) References Cited

U.S. PATENT DOCUMENTS

| | | | |
|---|---|---|---|
| 6,043,771 | A | 3/2000 | Clark et al. |
| 6,091,777 | A | 7/2000 | Guetz et al. |

(Continued)

FOREIGN PATENT DOCUMENTS

| | | |
|---|---|---|
| EP | 1533966 A2 | 5/2005 |
| EP | 1890413 A | 2/2008 |

(Continued)

OTHER PUBLICATIONS

Motorola: "Frequency Domain Scheduling for E-UTRA", 3rd Generation Partnership Project (3GPP), Technical Specification Group (TSG) Radio Access Network (RAN), Working Group 1 (WG1), XX, XX, No. R1-060381, Feb. 13, 2006, pp. 1-9.

(Continued)

*Primary Examiner* — Michael Neff
(74) *Attorney, Agent, or Firm* — Faegre Baker Daniels LLP

(57) ABSTRACT

An Orthogonal Frequency Division Multiplexing communication system, wherein a frequency bandwidth is divided into one or more Resource Blocks Groups (RBGs) each having one or more Resource Blocks, provides for feedback of channel quality information and precoding metrics for a same at least one RBG of the one or more RBGs. More particularly, a user equipment measures one or more channel quality parameters associated with at least one RBG of the one or more RBGs, determines channel quality information and a precoding metric for an RBG of the at least one RBG, and reports the channel quality information and a precoding metric determined for the RBG to a radio access network. In one embodiment of the invention, the RBG whose channel quality information and precoding metric are reported may be selected from the at least one RBG based on the measured channel quality parameters.

18 Claims, 4 Drawing Sheets

(56) References Cited

U.S. PATENT DOCUMENTS

| | | |
|---|---|---|
| 6,215,827 B1 | 4/2001 | Balachandran et al. |
| 6,317,409 B1 | 11/2001 | Murakami |
| 7,640,373 B2 | 12/2009 | Cudak et al. |
| 8,054,894 B2 | 11/2011 | Xiao et al. |
| 2004/0248618 A1 | 12/2004 | Yoshii et al. |
| 2004/0264507 A1 | 12/2004 | Cho et al. |
| 2005/0025039 A1 | 2/2005 | Hwang et al. |
| 2005/0128993 A1 | 6/2005 | Yu et al. |
| 2005/0201474 A1 | 9/2005 | Cho et al. |
| 2005/0238108 A1 | 10/2005 | Suh et al. |
| 2005/0287978 A1 | 12/2005 | Maltsev et al. |
| 2006/0146760 A1 | 7/2006 | Khandekar et al. |
| 2006/0193373 A1 | 8/2006 | Agee et al. |
| 2006/0203845 A1 | 9/2006 | Monogioudis |
| 2007/0098097 A1 | 5/2007 | Khan et al. |
| 2007/0217540 A1 | 9/2007 | Onggosanusi et al. |
| 2007/0223611 A1 | 9/2007 | Ode et al. |
| 2007/0242770 A1 | 10/2007 | Kim et al. |
| 2008/0013610 A1 | 1/2008 | Varadarajan et al. |
| 2008/0219370 A1* | 9/2008 | Onggosanusi et al. ....... 375/260 |
| 2010/0144282 A1 | 6/2010 | Laroia et al. |
| 2012/0051413 A1 | 3/2012 | Xiao et al. |

FOREIGN PATENT DOCUMENTS

| | | |
|---|---|---|
| JP | 2003-169036 A | 6/2003 |
| WO | 2004066104 A2 | 8/2004 |
| WO | 2004084420 A | 9/2004 |
| WO | 2006007299 A1 | 1/2006 |
| WO | 2006020741 A | 2/2006 |
| WO | 2006055241 A | 5/2006 |
| WO | 2006093468 A | 9/2006 |
| WO | 2006107835 A | 10/2006 |
| WO | 2007027825 A2 | 3/2007 |

OTHER PUBLICATIONS

Tarkesh Pande et al.: "On Some Techniques for Reducing the Feedback Requirement in Precoded MIMO-OFDM", Proceedings of IEEE Global Telecommunications Conference, San Francisco, CA, USA, Nov. 27, 2006, pp. 1-5.

Yakun Sun et al.: "Multi-User Scheduling for OFDM Downlink with Limited Feedback for Evolved UTRA", Vehicular Technology Conference, 2006, VTC-2006 Fall, 2006, IEEE 64th, IEEE, PI, Sep. 1, 2006, pp. 1-5.

Kolding, T.E. et al.: "Low-Bandwidth Channel Quality Indication ofr OFDMA Frequency Domain Packet Scheduling", Wireless Communication Systems, 2006., ISWCS '06. 3rd International Symposium on Wireless Communication Systems, Sep. 6-8, 2006, pp. 282-286.

Pedersen, K.I. et al.: "Frequency Domain Scheduling for OFDMA with Limited and Noisy Channel Feedback", Vehicular Technology Conference, 2007. VTC-2007 Fall, 2007 IEEE 66th Vehicular Technology Conference, Sep. 30-Oct. 3, 2007, pp. 1792-1796.

Patent Cooperation Treaty, International Search Report and Written Opinion of the International Searching Authority for International Application No. PCT/US2008/087277, Apr. 24, 2009, 11 pages.

United States Patent and Trademark Office, "Non-Final Rejection" for U.S. Appl. No. 13/290,447 dated Apr. 27, 2012, 8 pages.

Supplementary European Search Report, European Patent Office, Munich, Sep. 5, 2012, all pages.

* cited by examiner

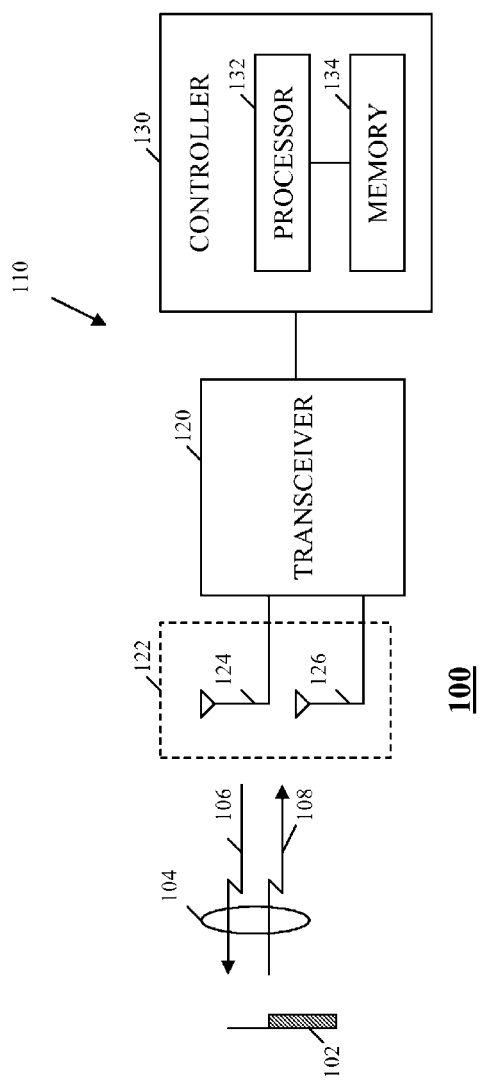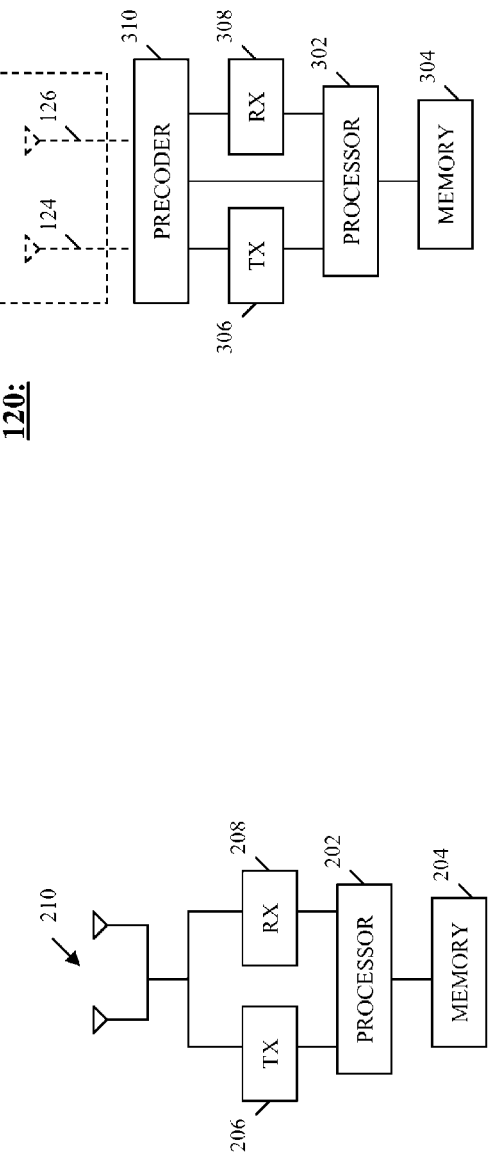
FIG. 1
FIG. 2
FIG. 3

800

METHOD AND APPARATUS FOR PROVIDING CHANNEL QUALITY AND PRECODING METRIC FEEDBACK IN AN ORTHOGONAL FREQUENCY DIVISION MULTIPLEXING COMMUNICATION SYSTEM

CROSS-REFERENCE TO RELATED APPLICATION

This application claims priority from provisional application Ser. No. 60/895,851, entitled "METHOD AND APPARATUS FOR PROVIDING CHANNEL QUALITY AND PRECODING METRIC FEEDBACK IN AN ORTHOGONAL FREQUENCY DIVISION MULTIPLEXING COMMUNICATION SYSTEM," filed Mar. 20, 2007, which is commonly owned and incorporated herein by reference in its entirety.

FIELD OF THE INVENTION

The present invention relates generally to Orthogonal Frequency Division Multiplexing (OFDM) communication systems, and, in particular, to provision of channel quality and preceding matrix feedback in an OFDM communication system.

BACKGROUND OF THE INVENTION

Orthogonal Frequency Division Multiple Access (OFDMA) modulation schemes have been proposed for downlink transmissions over an air interface in next generation communication systems such as 3GPP (Third Generation Partnership Project) E-UTRA (Evolved UMTS Terrestrial Radio Access) and 3GPP2 Phase 2 communication systems. In an OFDMA communication system, a frequency channel, or bandwidth, is split into multiple contiguous Resource Blocks (RBs). A grouping of multiple RBs is known as a Resource Block Group (RBG). Each RB comprises multiple, for example, 12, contiguous frequency sub-carriers that are orthogonal to each other. Under the 3GPP E-UTRA standards, a Node B then assigns the RBs to users' equipment (UEs) on a sub-frame basis, wherein a sub-frame may have a duration of one millisecond (ms). Within one sub-frame, distributed (for frequency diversity) and localized (resource block-based) transmission modes are multiplexed in an FDM manner.

That is, in a 3GPP E-UTRA communication system, UEs are assigned a Virtual Resource Block (VRB), which is a logical resource block that is associated with a same number of sub-carriers, again, 12 for example, as a RB. The VRB is then mapped to one or more RBs. One mapping scheme, known as a Localized VRB (LVRB), maps a VRB into a single RB, that is, maps the 12 sub-carriers of a VRB to the 12 sub-carriers of a corresponding RB. Localized mapping is used for Frequency Selective Scheduling (FSS), wherein transmission errors are minimized by scheduling a user equipment (UE) for a RB only where the UE is known to have a good downlink channel. Accordingly, FSS requires narrowband channel feedback from the UE, wherein the channel quality reported is specific to each RB. Reporting a CQI for each and every sub-band, or RB, may consume a significant amount of uplink system overhead, especially for OFDMA systems utilizing a 20 megahertz (MHz) bandwidth and employing as many as 100 sub-bands within that bandwidth. A second mapping scheme, known as a Distributed VRB (DVRB), maps a VRB into multiple RBs, that is, the 12 sub-carriers of a VRB are mapped to one or more sub-carriers of each of multiple RBs. Distributed mapping is used for Frequency Diverse Scheduling (FDS), wherein a VRB is distributed among multiple RBs without channel feedback or only wideband channel feedback, wherein the channel quality reported is over the whole bandwidth.

For any given Transmission Time Interval (TTI), the RBs are allocated to users based on measured channel conditions. The channel condition measurements are performed by a user equipment (UE), which UE measures channel conditions for one or more designated groups of RBs, that is, RBGs, during a measuring period, such as a Transmission Time Interval (TTI) (also known as a sub-frame) or a radio frame transmission period. The UE then reports the measured channel conditions for the RBG to a serving Node B in a Channel Quality Information (CQI) message. Based on the reported CQIs, an OFDMA communication system is able to selectively schedule the RBs over a scheduling period, typically one or more TTIs or radio frames, and further adaptively determine appropriate modulation and coding schemes for each RB during the scheduling period.

In addition, in a Multiple-Input Multiple-Output (MIMO) communication system, a UE also reports back a Precoding Matrix Indicator (PMI) for each RB. A base transceiver station (BTS), or Node B, then uses a PMI to beamform a signal for transmission to the UE via an antenna array and over an associated RB. More particularly, the BTS, or Node B, maintains a set of matrices for predistortion of signals transmitted via the antenna array. The PMI then indexes the set of matrices, indicating a set of complex values to be used to predistort a signal for transmission via the antenna array and the intervening wireless link.

Currently, CQI and PMI reporting is disjoint, that is, there is no coordination between RBs measured to determine PMIs and RBs measured to determine CQIs. The RBs measured for a CQI determination and PMI determination are determined separate from, and independent of, each other and the CQI and PMI determinations are separately reported via separate feedback channels. In addition, PMI is reported in a form of narrowband channel feedback from the UE wherein the PMI reported is specific to each RB regardless of the RBs likely to be scheduled for a UE. By contrast, CQIs may be reported in either a narrowband or wideband channel feedback form and may be reported only for the best RBs. In a system that dynamically allocates RBs every TTI, the PMI feedback is reported every TTI and can consume a significant amount of uplink capacity, and in conjunction with narrowband CQI feedback can consume an excessive amount of uplink overhead.

Therefore, a need exists for a method and apparatus that provides PMI and CQI channel quality feedback sufficient to schedule RBs and to provide optimal MIMO/beamforming weights that does not consume the overhead resulting from the separate, disjoint reporting of PMI and CQI.

BRIEF DESCRIPTION OF THE DRAWINGS

FIG. 1 is a block diagram of a wireless communication system in accordance with an embodiment of the present invention.

FIG. 2 is a block diagram of a user equipment of FIG. 1 in accordance with an embodiment of the present invention.

FIG. 3 is a block diagram of a transceiver of FIG. 1 in accordance with an embodiment of the present invention.

Figure 4:
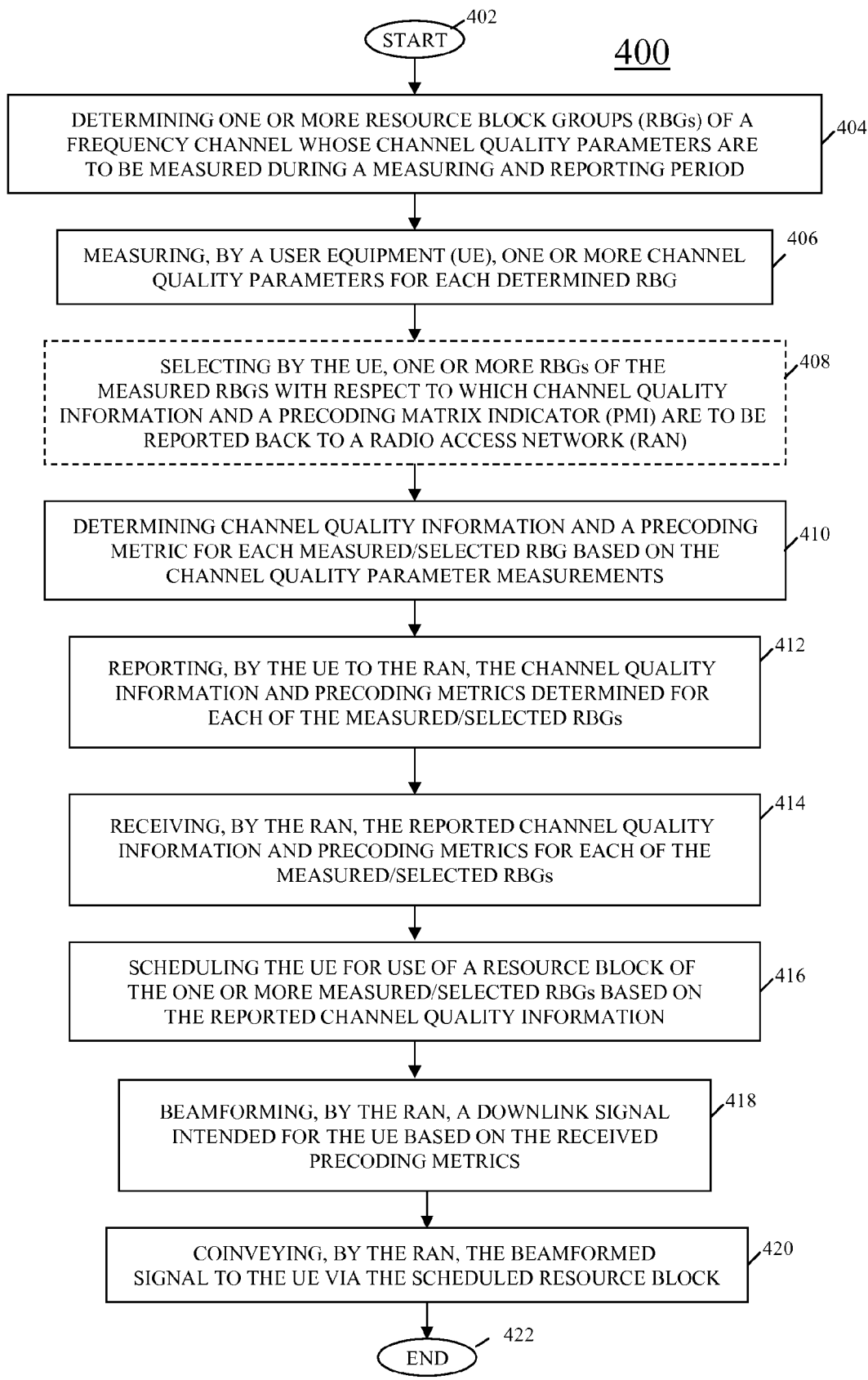
FIG. 4 is a logic flow diagram of a method for a reporting of information concerning channel quality and a precoding metric by a user equipment of FIG. 1 to a serving radio access network of FIG. 1 in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that provides PMI and CQI channel quality feedback sufficient to schedule Resource Blocks (RBs) and to provide optimal MIMO/beamforming weights that does not consume the overhead resulting from the separate, disjoint reporting of PMI and CQI, an Orthogonal Frequency Division Multiplexing (OFDM) communication system, wherein a frequency bandwidth is divided into one or more Resource Blocks Groups (RBGs) each having one or more RBs, provides for feedback of channel quality information and procoding metrics for a same at least one RBG of the one or more RBGs. More particularly, a user equipment measures one or more channel quality parameters associated with at least one RBG of the one or more RBGs, determines channel quality information and a precoding metric for an RBG of the at least one RBG, and reports the channel quality information and a precoding metric determined for the RBG to a radio access network. In one embodiment of the invention, the RBG whose channel quality information and a precoding metric are reported back to the radio access network may be selected from the at least one RBG based on the measured channel quality parameters.

Generally, an embodiment of the present invention encompasses a method for providing channel quality feedback in an OFDM communication system wherein a frequency bandwidth is divided into one or more RBGs each having one or more RBs. The method includes measuring one or more channel quality parameters associated with at least one RBG of the one or more RBGs, determining channel quality information and a precoding metric for an RBG of the at least one RBG, and reporting the channel quality information and a precoding metric determined for the RBG to a radio access network.

Another embodiment of the present invention encompasses a user equipment that is configured to report a channel quality in an OFDM communication system, wherein a frequency bandwidth is divided into one or more RBGs each having one or more RBs. The user equipment comprises a processor that is configured to measure one or more channel quality parameters associated with at least one RBG of the one or more RBGs, determine channel quality information and a precoding metric for an RBG of the at least one RBG, and report the channel quality information and a precoding metric determined for the RBG to a radio access network.

The present invention may be more fully described with reference to FIGS. 1-8. FIG. 1 is a block diagram of a wireless communication system 100 in accordance with an embodiment of the present invention. Communication system 100 includes a user equipment (UE) 102, such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a Radio Access Network (RAN) 110 that provides communication services to UE 102 via an air interface 104. RAN 110 includes a transceiver 120, such as a Node B or a Base Transceiver Station (BTS), in wireless communication with UE 102 and further includes a network controller 130, such as a Radio Network Controller (RNC) or a Base Station Controller (BSC), coupled to the transceiver. Air interface 104 comprises a downlink (DL) 106 and an uplink (UL) 108. Each of downlink 106 and uplink 108 comprises multiple physical communication channels, including multiple control channels and multiple traffic channels.

Transceiver 120 is coupled to an antenna array 122 via a duplexer. Antenna array 122 comprises multiple antenna elements 124, 126 (two shown). By utilizing an antenna array to transmit signals to an UE located in a coverage area, such as a cell or sector serviced by the antenna array, RAN 110 is able to utilize a beamforming or MIMO technique for the transmission of the signals. Controller 130 includes a processor 132, such as one or more microprocessors, microcontrollers, digital signal processors (DSPs), combinations thereof or such other devices known to those having ordinary skill in the art. The particular operations/functions of processor 132, and thus of controller 130, are determined by an execution of software instructions and routines that are stored in a respective at least one memory device 134 associated with the processor, such as random access memory (RAM), dynamic random access memory (DRAM), and/or read only memory (ROM) or equivalents thereof, that store data and programs that may be executed by the corresponding processor.

Referring now to FIGS. 2 and 3, block diagrams respectively are provided of UE 102 and transceiver 120 in accordance with an embodiment of the present invention. Each of UE 102 and transceiver 120 includes a respective processor 202, 302, such as one or more microprocessors, microcontrollers, digital signal processors (DSPs), combinations thereof or such other devices known to those having ordinary skill in the art. The particular operations/functions of processors 202, 302 and respectively thus of UE 102 and transceiver 120, is determined by an execution of software instructions and routines that are stored in a respective at least one memory device 204, 304 associated with the processor, such as random access memory (RAM), dynamic random access memory (DRAM), and/or read only memory (ROM) or equivalents thereof, that store data and programs that may be executed by the corresponding processor.

Each of UE 102 and transceiver 120 further includes a respective transmitter 206, 306 and a respective receiver 208, 308, which transmitter and receiver are each coupled to the processor 202, 302 of the UE and transceiver. UE 102 further includes one or more antennas 210, and transceiver 120 further includes a precoder 310 that is coupled to processor 302 and that is interposed between antenna array 122 and each of transmitter 306 and receiver 308. Precoder 310 weights signals applied to the multiple antenna elements 124, 126 of transceiver 120 based on a precoder metric received from UE 102 in order to predistort and beamform the signals for transmission over downlink 106.

Each of UE 102 and transceiver 120 further maintains, in at least one memory devices 204 and 304 and/or in precoder 310, a precoding matrix, which precoding matrix comprises multiple sets of matrices and wherein each set of matrices is associated with a combination of antenna elements for downlink transmission and with weights applicable to each antenna element. Precoding matrices are well-known in the art and will not be described in greater detail, except to note that the precoding matrix maintained by each of UE 102 and transceiver 120 is the same. Based on the channel conditions measured by UE 102 with respect to a Resource Block Group (RBG), the UE reports back a precoding metric, preferably a Precoding Matrix Indicator (PMI), for the RBG. In determining a precoding metric for an RBG, the UE computes a set of complex weights based on the measured channel conditions. The set of complex weights can be Eigen Beamforming vectors derived from downlink (DL) reference signal (RS) measurements. The complex weights are mapped to a set of already defined vectors, that it, to a nearest vector of the set of already defined vectors, to produce a precoding vector. The UE then conveys the index of the precoding vector selected by the UE using an uplink (UL) control channel (UL CCH).

The embodiments of the present invention preferably are implemented within UE 102, transceiver 120, and controller 130, and more particularly with or in software programs and instructions stored in the respective at least one memory devices 204, 304, 134 and executed by respective processors 202, 302, 132. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 102, transceiver 120, and controller 130. Based on the present disclosure, one skilled in the art will be readily capable of producing and implementing such software and/or hardware without undo experimentation.

Communication system 100 comprises a Multiple-Input Multiple-Output (MIMO) and/or smart antenna packet data communication system that employs an Orthogonal Frequency Division Multiple Access (OFDMA) modulation scheme for transmitting data over air interface 120, wherein a frequency channel, or bandwidth, is split into multiple frequency sub-bands, wherein each sub-band comprises multiple orthogonal frequency sub-carriers over a given number of OFDM symbols, that are the physical layer channels over which traffic and signaling channels are transmitted in a TDM or TDM/FDM fashion. Each sub-band corresponds to a Resource Block (RB) during a given time period, such as over 12 OFDM symbols in a 3GPP E-UTRA communication system. In addition, in a 3GPP E-UTRA communication system, each RB includes 12 sub-carriers. A user may then be assigned one or more Resource Blocks (RBs) for an exchange of bearer information, thereby permitting multiple users to transmit simultaneously on the different RBs such that each user's transmission is orthogonal to the other users' transmissions. The channel bandwidth may be sub-divided into one or more Resource Block Groups (RBGs), wherein each RBG comprises one or more RBs that may or may not be contiguous and the RBGs may or may not be of equal size.

Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP2 (Third Generation Partnership Project 2) Evolution or Phase 2 communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultra wideband (UWB) communication systems.

In order to selectively schedule multiple UEs, such as UE 102, for use of one or more RBs during a given time slot, RAN 110 provides each such UE with scheduling information for a scheduling period. The scheduling information typically includes a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated RB.

In order to selectively schedule a UE, such as UE 102, to use a frequency channel employed by communication system 100, and more particularly to use one or more RBs of the frequency channel, and to perform beamforming/MIMO for transmission of a downlink signal to the UE via the scheduled RB(s), UE 102 reports channel quality information, preferably a 'Channel Quality Information' (CQI) as is known in the art, and a precoding metric, preferably a Precoding Matrix Indicator (PMI), associated with a same RBG to RAN 110. The RBG may be an RBG designated for a reporting of a CQI during a measurement and reporting period, or the RBG may be selected for a reporting of a CQI based on measured channel qualities of one or more RBGs during the measurement and reporting period. In either instance, during a measurement and reporting period the channel quality information and precoding metric are determined over, and reported back for, a same set of RBs. Since some UEs do not support MIMO and therefore cannot take advantage of precoding, RAN 110 may identify one or more RBGs that will be used to support MIMO and for which channel quality and precoding metrics are to be provided, as opposed to RBGs that will be allocated to UEs that do not support MIMO and for which precoding metrics need not be provided.

Referring now to FIG. 4, a logic flow diagram 400 is provided that depicts a reporting of channel quality information and precoding metrics by a UE, such as UE 102, to a serving RAN, that is, RAN 110, in accordance with an embodiment of the present invention. Logic flow 400 begins (402) when UE 102 determines (404) at least one RBG of one or more RBGs included in the frequency channel, or bandwidth, utilized by communication system 100 and whose channel quality parameters are to be measured during a measurement and reporting period for the purpose of generating channel quality information, such as 'Channel Quality Information' (CQI) as is known in the art, and precoding metrics, such as Precoding Matrix Indicators (PMIs), to be fed back to RAN 110. The RBs constituting an RBG need not be contiguous to each other, and the number of RBs included in an RBG may vary from one RBG to another RBG and may vary for an RBG from one measurement and reporting period to another measurement and reporting period.

UE 102 then measures (406) one or more channel quality parameters for each determined RBG. For example, UE 102 may measure one or more of a received signal power, a signal-to-noise ratio, a carrier-to-interference ratio, or a carrier power-to-noise power ratio associated with a signals transmitted over the RBs included in each determined RBG (for example, measured with respect to a DL reference signal (RS)) or may measure a bit error rate or a frame error rate associated with each such a signal. One of ordinary skill in the art realizes that many parameters may be measured in determining channel quality and that any such parameter may be used herein without departing from the spirit and scope of the present invention. The channel quality information is used by RAN 110 to schedule UEs for use of RBs, and channel quality parameters that are used to generate the channel quality information may or may not be the same as channel quality parameters that are used to generate the precoding metrics.

In one embodiment of the present invention, RAN 110 may inform UE 102 of the one or more RBGs to be measured and reported during a measurement and reporting period. For example, RAN 110 may provide UE 102 with a bitmap identifying RBs to monitor during each of one or more measurement and reporting periods. In this way, the RBs included in a measured RBG may be varied from period to period. By way of another example, UE 102 and RAN 110 each may maintain, in their respective at least one memory devices 204, 304, a list of RBGs, wherein each RBG in the list is associated with an index number. RAN 110 then may provide UE 102 with an identifier, such as an index number, of an RBG to be measured and reported during each of one or more measurement and reporting periods and, based upon the identifier, the UE is able to determine the frequencies to monitor during each measurement and reporting period.

Figure 5:
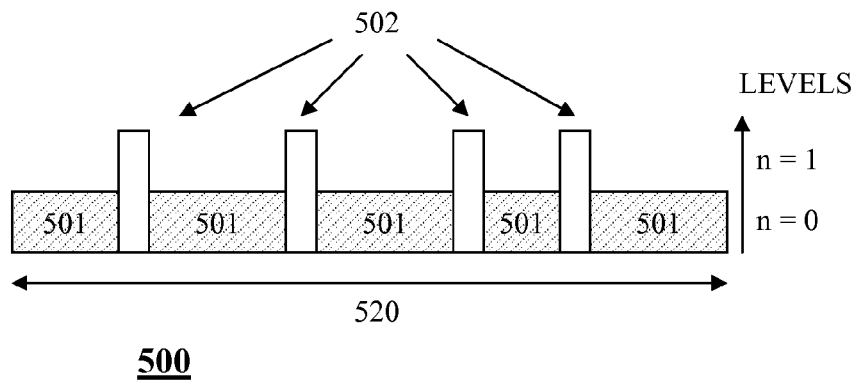
FIG. 5 is a block diagram illustrating an exemplary channel quality feedback scheme that may be employed by the communication system of FIG. 1 in accordance with an embodiment of the present invention.

For example, referring now to FIG. 5, a block diagram 500 is provided that illustrates an exemplary bitmap channel quality feedback scheme that may be employed by communication system 100 in accordance with an embodiment of the present invention. In block diagram 500, communication system 100 may divide a frequency channel 520 into two RBGs 501, 502. For example, suppose frequency bandwidth 520 comprises 300 frequency sub-carriers. Furthermore, suppose each RB comprises 12 contiguous sub-carriers. As a result, frequency bandwidth 520 then comprises 25 RBs that may be combined in any way to constitute an RBG. RAN 110 then may convey a bitmap to UE 102 in order to identify the RBs for which channel quality information is to be reported during a measurement and reporting period, which bitmap may include 25 bits and wherein a value of '1' indicates that a corresponding RB should be measured and reported and a value of '0' indicates that a corresponding RB should not be reported. During a first measurement and reporting period (n=0), UE 102 may measure and report both RBGs 501 and 502. During a second measurement and reporting period (n=1), UE 102 may measure and report only RBG 502.

Figure 6:
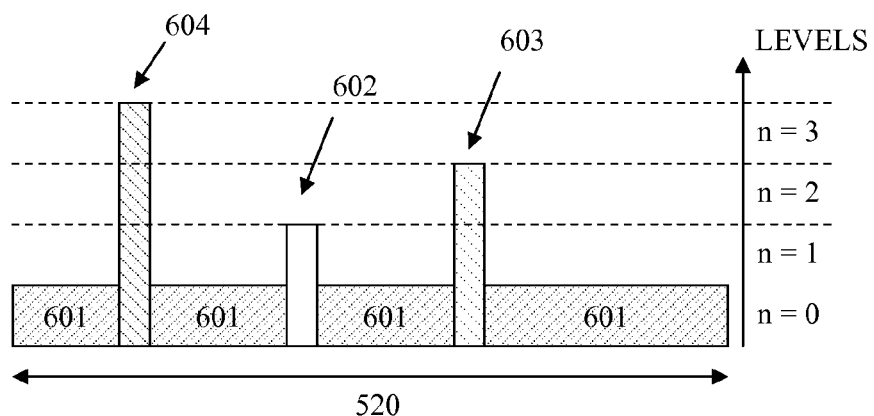
FIG. 6 is a block diagram illustrating an exemplary channel quality feedback scheme that may be employed by the communication system of FIG. 1 in accordance with another embodiment of the present invention.

In another embodiment of the present invention, UE may determine the one or more RBGs to be measured and reported during a measurement and reporting period based on channel quality measurements for a previous measurement and reporting period. For example, FIG. 6 is a block diagram 600 that illustrates an exemplary channel quality feedback scheme, such as a Top-M feedback scheme, that may be employed by communication system 100 in accordance with the another embodiment of the present invention. During a first measurement and reporting period (n=0), the RBG measured and reported by UE 102 may comprise all RBs, that is, the RBs of RBGs 601-604, and UE 102 feeds back channel quality information and precoding metrics for all of these RBs. During a second measurement and reporting period (n=1), the RBGs measured and reported by UE 102 may comprise RBs associated with a limited set of the RBGs reported during the first reporting period, for example, RBGs 602-604. The RBGs measured and reported during a measurement and reporting period may be selected based on the channel quality measurements of the previous measurement and reporting period or based on any other consideration that may occur to one of ordinary skill in the art. For example, RBGs 602-604 may have had the best channel quality measurements of the first measurement and reporting period. Similarly, during a third measurement and reporting period (n=2), UE 102 may measure and report RBs associated with a limited set of the RBGs reported during the second reporting period, for example, RBGs 603 and 604, and during a fourth measurement and reporting period (n=3), UE 102 may measure and report RBs associated with a limited set of the RBGs reported during the third reporting period, for example, RBG 604. Again, the RBGs measured and reported during each measurement and reporting period may have had the best channel quality measurements of the preceding measurement and reporting period.

Figure 7:
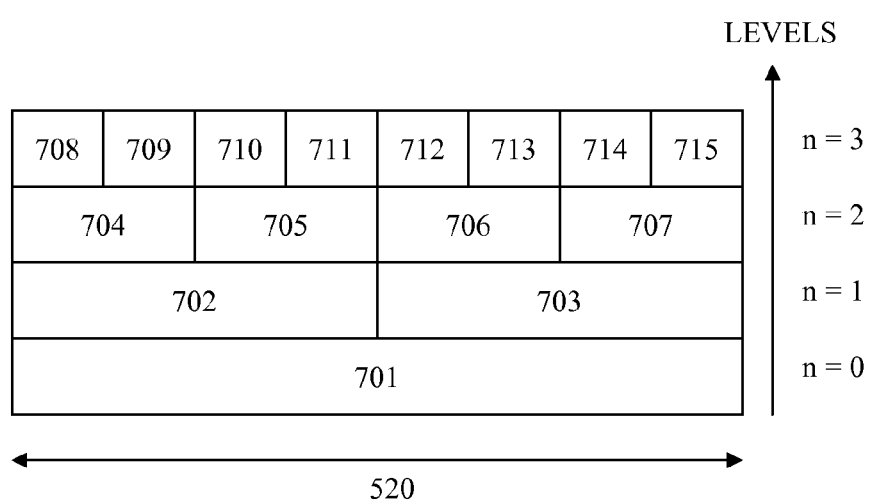
FIG. 7 is a block diagram illustrating an exemplary channel quality feedback scheme that may be employed by the communication system of FIG. 1 in accordance with another embodiment of the present invention.

In yet another embodiment of the present invention, UE 102 may re-determine the RBGs during each measurement and reporting period and report back only a best measured RBG during that measurement and reporting period. For example, FIG. 7 is a block diagram 700 is a block diagram 700 that illustrates an exemplary channel quality feedback scheme, such as a Hybrid feedback scheme, that may be employed by communication system 100 in accordance with the yet another embodiment of the present invention. During a first measurement and reporting period (n=0), a single RBG comprises all of the RBs in frequency channel, or bandwidth, 420. UE 102 measures channel quality parameters for all of the RBs and reports back an averaged channel quality parameter for the entire bandwidth. During a second measurement and reporting period (n=1), frequency channel 420 is divided into two RBGs 702, 703. UE 102 measures channel quality parameters for each of RBGs 702 and 703 and reports back a channel quality parameters for a selected one or more of RBGs 702 and 703, for example, for a best measured RBG. During a third measurement and reporting period (n=2), frequency channel 420 is divided into four RBGs 704-707. UE 102 measures channel quality parameters for each of the four RBGs and reports back channel quality parameters for a selected one or more of RBGs 704-707, again, for example, for a best measured RBG. During a fourth measurement and reporting period (n=3), frequency channel 420 is divided into eight RBGs 708-715. UE 102 measures channel quality parameters for each of the eight RBGs and reports back channel quality parameters for a selected one or more of RBGs 708-715, again, for example, for a best measured RBG.

In one embodiment of the invention, UE 102 then determines (410) channel quality information, preferably a CQI, and a precoding metric, preferably a PMI, for each measured RBG based on the channel quality parameters measurements and reports (412) the determined channel quality information and the precoding metric to RAN 110 in association with the measured RBG. Preferably, UE 102 reports the determined channel quality information and the precoding metric over a control channel of uplink 108. In another embodiment of the invention, based on the channel quality parameters measured by UE 102 for the determined one or more RGBs, the UE may select (408) one or more RBGs with respect to which channel quality information and a precoding metric are to be reported back to RAN 110. UE 102 then determines (410) channel quality information, preferably a CQI, and a precoding metric, preferably a PMI, for each selected RBG based on the channel quality parameters measurements and reports (412) the determined channel quality information and the precoding metric to RAN 110 in association with the one or more selected RBGs. The reporting may be via a same channel, such as the CQICH previously reserved for CQI messages, and in a same message, thereby conserving system overhead and channel usage. Multiple algorithms will occur to one of ordinary skill in the art to be used to determine which one or more RBGs of the measured RBGs whose channel quality information and precoding metric are to be reported back to RAN 110, and any such algorithm may be used herein without departing from the spirit and scope of the present invention.

In reporting channel quality information, preferably a CQI, and a precoding metric, preferably a PMI, back to RAN 110 for each determined RBG, UE 102 assembles and conveys to the RAN, during the measurement and reporting period, one or more reports informing of a channel quality and the precoding metric. Preferably, UE 102 includes in each of the one or more reports an identifier of the measured and/or selected RBs and/or RBGs along with the associated channel quality information and precoding metric.

Figure 8:
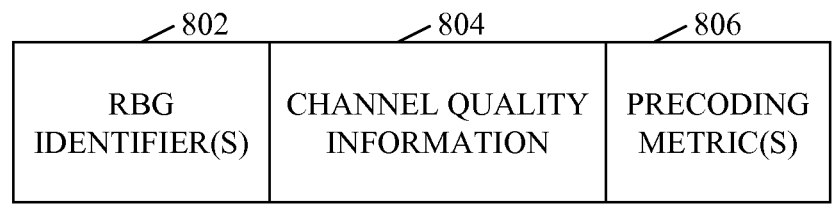
FIG. 8 is a block diagram is depicted of an exemplary joint channel quality information/precoding metric overhead message in accordance with an embodiment of the present invention.

For example, FIG. 8 is a block diagram of an exemplary joint channel quality information/precoding metric report 800 that may be assembled and conveyed by UE 102 in accordance with various embodiments of the present invention. Report 800 includes a first data field 802 that comprises an identifier of the one or more reported RBGs. In other embodiments of the present invention, first data field 802 may comprise a bitmap identifying an RBG whose channel quality data and precoding metrics are being provided. Report 800 further includes a second data field 804 that comprises channel quality information, such as channel quality measurements, associated with the RBGs identified in the first data field. Report 800 further includes a third data field 806 that comprises one or more precoding metrics, such as PMIs, associated with the RBGs identified in the first data field. Preferably, the second the third data fields 804, 806 are ordered so that their reported channel quality information and precoding metrics align with the RBGs identified in first data field 802.

When the RBG being measured and reported comprises the entire frequency channel, or bandwidth, then the channel quality information reported by the UE may comprise a channel quality value averaged over the entire bandwidth and a precoding metric may be determined for the entire frequency bandwidth based on the averaged channel quality. For example, typically channel quality measurements are made for channels that are significantly narrower than the entire frequency bandwidth. When the frequency bandwidth comprises multiple RBGs that are each sufficiently narrow, a channel quality measurement may cover all or nearly all of the sub-band. However, when the frequency bandwidth comprises one or more RBGs that are particularly wide, such as a single RBG that covers nearly the entire frequency bandwidth, then each RBG may be associated with multiple channels that are measured during a measuring period. In such an event, UE 102 may average the channel quality measurements made for the multiple channels during a measuring period to produce an average channel quality measurement and to determine a precoding metric that is reported by the UE for the RBG.

In response to receiving (414) the channel quality information for the one or more measured and/or selected RBGs, RAN 110, preferably transceiver 120, schedules (416) UE 102, during a subsequent sub-frame, for use of one or more RBs of the one or more reported RBGs whose channel quality information and precoding metric is fed back by the UE. In addition, in response to receiving the precoding metrics associated with the one or more measured and/or selected RBGs, RAN 110, and in particular transceiver 120, beamforms (418) a downlink signal intended for UE 102 and then transmits (420) the beamformed signal, preferably a MIMO/beamformed signal, to the UE via the scheduled one or more RBs. In beamforming the signal, transceiver 120 determines, based on the received precoding metric, a weight in association with each antenna element of the multiple antenna elements 124, 126 of antenna array 122 and in association with each selected RB for predistortion of a downlink transmission. Precoder 310 then applies the weight associated with each antenna element of the multiple antenna elements 124, 126 to a signal received from transmitter 306, as is known in the art, to produce a MIMO/beamformed signal that is then transmitted to UE 102 via one or more of the multiple antenna elements and over the selected one or more RBs. Logic flow 400 then ends (422).

By determining, and reporting back, channel quality information and precoding metrics for a same one or more RBGs during a measurement and reporting period, communication system 100 coordinates determination and reporting of the channel quality information and precoding metrics. By coordinating the determination and reporting, communication system 100 conserves system overhead as opposed to the disjoint determination and reporting of CQIs and PMIs in the prior art, wherein PMIs are determined for all RBs in a frequency bandwidth regardless of the RBs likely to be scheduled for a UE and are reported separate from, and over separate channels from, the CQIs.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having," as used herein, are defined as comprising. The term "coupled," as used herein, is defined as connected, although not necessarily directly, and not necessarily mechanically. An element preceded by " . . . a" does not, without more constraints, preclude the existence of additional identical elements in the process, method, article, or apparatus that the element. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing channel quality feedback in an Orthogonal Frequency Division Multiplexing communication system wherein a frequency bandwidth is divided into a plurality of Resource Blocks Groups each having one or more Resource Blocks and wherein the method comprises:
   measuring one or more channel quality parameters associated with at least one Resource Block Group of the plurality of Resource Block Groups;
   selecting one or more, but fewer than all, Resource Block Groups of the plurality of Resource Block Groups;
   determining channel quality information (CQI) and a precoding metric for the selected Resource Block Groups based on the measurements; and
   reporting, only for the selected Resource Block Groups, the channel quality information and the precoding metric determined for the selected Resource Block Groups over a same channel to a radio access network.

2. The method of claim 1, wherein the number of Resource Blocks included in a Resource Block Group (RBG) may vary from one RBG to another RBG and may vary for an RBG from one measurement and reporting period to another measurement and reporting period.

3. The method of claim 1, wherein selecting comprises selecting the one or more Resource Block Groups based on the measured one or more channel quality parameters.

4. The method of claim 1, wherein the channel quality information comprises CQI information and the precoding metric is a Precoding Matrix Indicator.

5. The method of claim 1, wherein the channel is an uplink control channel.

6. The method of claim 1, wherein reporting channel quality information and a precoding metric associated with the selected one or more Resource Blocks Groups to a radio access network comprises conveying a joint channel quality information/precoding metric report to the radio access network.

7. The method of claim 1, wherein measuring comprises:
   determining at least one Resource Block Group of the one or more Resource Block Groups for measurement of one or more channel quality parameters; and
   measuring one or more channel quality parameters associated with the determined at least one Resource Block Group.

8. The method of claim 7, wherein the at least one Resource Block Group is determined based on one or more of:
   selecting one or more Resource Block Groups of the plurality of Resource Block Groups based on a received bitmap identifying one or more Resource Blocks;
   selecting one or more Resource Block Groups that are a limited set of Resource Block Groups selected and reported during a preceding reporting period; and
   selecting one or more Resource Block Groups from among the plurality of Resource Block Groups that have a best measured one or more channel quality parameters.

9. The method of claim 1, further comprising beamforming a downlink signal based on the reported precoding metric.

10. The method of claim 9, wherein the beamformed signal is a MIMO/beamformed signal and wherein the method further comprises transmitting the MIMO/beamformed signal over the at least one Resource Block of the Resource Block Group whose channel quality information and a precoding metric are reported.

11. A user equipment that is configured to report a channel quality in an Orthogonal Frequency Division Multiplexing communication system, wherein a frequency bandwidth is divided into a plurality of Resource Blocks Groups each having one or more Resource Blocks and wherein the user equipment comprises a processor that is configured to measure one or more channel quality parameters associated with at least one Resource Block Group of the plurality of Resource Block Groups, select one or more, but fewer than all, Resource Block Groups of the plurality of Resource Block Groups, determine channel quality information and a precoding metric for the selected Resource Block Groups based on the measurements, and report, only for the selected Resource Block Groups, the channel quality information and the precoding metric determined for the selected Resource Block Groups to a radio access network over a same channel.

12. The method of claim 11, wherein the number of Resource Blocks included in an Resource Block Group (RBG) may vary from one RBG to another RBG and may vary for an RBG from one measurement and reporting period to another measurement and reporting period.

13. The user equipment of claim 11, wherein the processor is configured to select the one or more Resource Block Groups based on the measured one or more channel quality parameters.

14. The user equipment of claim 11, wherein the channel quality information comprises CQI information and the precoding metric is a Precoding Matrix Indicator.

15. The user equipment of claim 11, wherein the channel is an uplink control channel.

16. The user equipment of claim 11, wherein the processor is configured to report channel quality information and a precoding metric associated with the selected one or more Resource Block Groups to a radio access network by conveying a joint channel quality information/precoding metric report to the radio access network.

17. The user equipment of claim 11, wherein the processor is configured to measure one or more channel quality parameters by determining at least one Resource Block Group of the one or more Resource Block Groups for measurement of one or more channel quality parameters and measuring one or more channel quality parameters associated with the determined at least one Resource Block Group.

18. The user equipment of claim 17, wherein the processor is configured to determine at least one Resource Block Group based on one or more of:
   selecting one or more Resource Block Groups of the plurality of Resource Block Groups based on a received bitmap identifying one or more Resource Blocks;
   selecting one or more Resource Block Groups that are a limited set of Resource Block Groups selected and reported during a preceding reporting period; and
   selecting one or more Resource Block Groups from among the plurality of Resource Block Groups that have a best measured one or more channel quality parameters.

* * * * *